United States Patent Office.

WILLIAM HIBBERT, OF MANCHESTER, ENGLAND.

Letters Patent No. 89,481, dated April 27, 1869.

IMPROVED MEDICAL COMPOUND.

The Schedule referred to in these Letters Patent and making part of the same.

*To all whom it may concern:*

Be it known that I, WILLIAM HIBBERT, of the city of Manchester, in the county of Lancaster, England, have invented new and useful "Improvements in the Combination of Chemical Matters for the Prevention or Cure of Contagious and other Diseases to which Human Beings and Animals are Subject;" and I do hereby declare that the following is a full and exact description thereof; that is to say—

This invention consists of a compound solution, to be used internally, as a medicine, or outwardly, as baths, embrocations, or saturated bandages. It also acts as a disinfectant and preventive agent against infectious diseases generally.

This compound is particularly applicable to preventing and arresting the progress of fermentation and decomposition in the stomach, bowels, blood, or other bodily fluids of human beings or animals, and therefore acts with chemical certainty in the cure of all diseases arising from or resulting therefrom, as in cholera, fever, scrofulous or cutaneous affections, small-pox, measles, or other eruptions, tumors, cancer, piles, womb and other fermentive or inflammatory diseases. It disinfects the breath and evacuations, and therefore makes contagious diseases not contagious. Nurses become less susceptible to contagious influence by taking occasional doses.

Outwardly applied, it quickly reduces inflammation, by its powerful action in the abstraction of caloric from the brain, bowels, or other internal parts, as well as in cases of rheumatism, gout, sciatica, neuralgia, and other fermentive or inflammatory complaints.

In painful operations, fermentation or inflammatory action is arrested, and therefore mortification is prevented.

Bedding and clothing are instantly disinfected by immersion in the compound.

This compound is also most beneficial to animals, especially in such cases as glanders, farcy, poll-evil, colic, greasy legs, &c.

The compound consists of chlorides of magnesium and bromine in combination.

I take chloride of magnesium in solution at about 50° Twaddell. Add from one to two ounces of bromine to a gallon of the said solution.

For human beings, ten to twenty drops, in a wine-glass of pure water, will be a sufficient dose for an adult, to be repeated as the case may require.

For cattle, one to two ounces of the solution may be given in a pint of water, or as much water as the beast will drink; but these proportions may be varied, according to the virulence of the disease.

For outward applications, such as baths or embrocations, the said solution may be freely applied; also, painless bandages, which do not stick to the skin when being taken off, are obtained by impregnating cloth with the above-named solution.

When used for outward application, (when the skin is not broken,) the solution may be employed at its full strength, without dilution with water.

The solution may also be freely used as a disinfectant for hospitals, barracks, holds of ships, railway-trucks, and similar places.

I also use chlorides of magnesium and bromine for preserving animal matters for shipment as food, the strength to be about 16° Twaddell.

My method of preventing contagion, being communicated or received through the medium of the skin, is by impregnating the skin with the solution, by which isolation from the infection, through the medium of the skin, is obtained.

Small doses of the solution occasionally given to healthy animals enable nature to resist the influence of contagion, and will lessen if not entirely obviate the violence of an attack of rinderpest or other contagious disease, and assist nature to throw off the influence altogether without isolation.

I claim the use of chloride of magnesium and bromine in combination, for the prevention or cure of contagious and other diseases arising from fermentation and decomposition, whether in human beings or animals.

Done at Manchester, England, this 3d day of January, 1868.

WILLIAM HIBBERT.

Witnesses:
 EDWARD THOMAS HUGHES,
  *Patent Agent, London.*
 C. SEPTIMUS HUGHES,
  *Patent Agent, Manchester.*